US009076192B2

(12) United States Patent
Bertheau et al.

(10) Patent No.: US 9,076,192 B2
(45) Date of Patent: Jul. 7, 2015

(54) METHOD OF DETECTING AND QUANTIFYING BLUR IN A DIGITAL IMAGE

(75) Inventors: Philippe Bertheau, Paris (FR); David Ameisen, Paris (FR)

(73) Assignee: Université Paris Diderot—Paris 7, Paris (FR)

( * ) Notice: Subject to any disclaimer, the term of this patent is extended or adjusted under 35 U.S.C. 154(b) by 93 days.

(21) Appl. No.: 13/993,988

(22) PCT Filed: Dec. 12, 2011

(86) PCT No.: PCT/FR2011/052951
§ 371 (c)(1),
(2), (4) Date: Sep. 30, 2013

(87) PCT Pub. No.: WO2012/080643
PCT Pub. Date: Jun. 21, 2012

(65) Prior Publication Data
US 2014/0023266 A1     Jan. 23, 2014

(30) Foreign Application Priority Data
Dec. 13, 2010  (FR) ..................... 10 60445

(51) Int. Cl.
*G06K 9/00* (2006.01)
*G06T 7/00* (2006.01)
*G06T 5/00* (2006.01)

(52) U.S. Cl.
CPC ............... *G06T 7/0002* (2013.01); *G06T 5/003* (2013.01); *G06T 2207/30004* (2013.01)

(58) Field of Classification Search
USPC ......... 382/162, 165, 199, 206, 224, 255, 274, 382/279, 286
See application file for complete search history.

(56) References Cited

U.S. PATENT DOCUMENTS

| 2003/0151674 | A1  | 8/2003 | Lin |
| 2008/0226148 | A1* | 9/2008 | Gu et al. ................ 382/128 |
| 2010/0086206 | A1* | 4/2010 | Hong ....................... 382/168 |
| 2010/0232706 | A1* | 9/2010 | Forutanpour ........... 382/199 |

OTHER PUBLICATIONS

"HSL and HSV," anonymous, retrieved from the internet: URL:http://en.wikipedia.org/w/index.php?title-HSL_and_HSV&oldid=401179452 (retrieved on Apr. 6, 2011), pp. 1-16, Dec. 8, 2010.
Yeo, T., et al., "Autofocusing for tissue microscopy," Image and Vision Computing, Elsevier, Guildford, Great Britain, vol. 11, No. 10, pp. 629-639, 1993.
Yu, Sun et al., "Autofocusing Algorithm Selection in Computer Microscopy," Intelligent Robots and Systems, IEEE, Piscataway, New Jersey, pp. 419-425, 2005.
Search Report for PCT/FR2011/052951, dated Apr. 17, 2012.

* cited by examiner

*Primary Examiner* — Phuoc Tran
(74) *Attorney, Agent, or Firm* — Marshall, Gerstein & Borun LLP

(57) ABSTRACT

Method of detecting and quantifying blur in a digital image implementing a computer and comprising: —a step a) of obtaining a digital image; a step b) of obtaining a brightness parameter for each pixel on the basis of the digital image, the step b) comprising an operation of convolution with an edge detection matrix; a step c) of calculation of a score S1 comprising the maximum, calculated over all the pixels, of the brightness parameter obtained in step b); and a step d) a step of evaluating the digital image, the digital image being considered to be blurred if the score S1 obtained in step c) is strictly less than a first predetermined threshold, the score S1 providing a first quantity of blur present in the digital image.

11 Claims, 4 Drawing Sheets

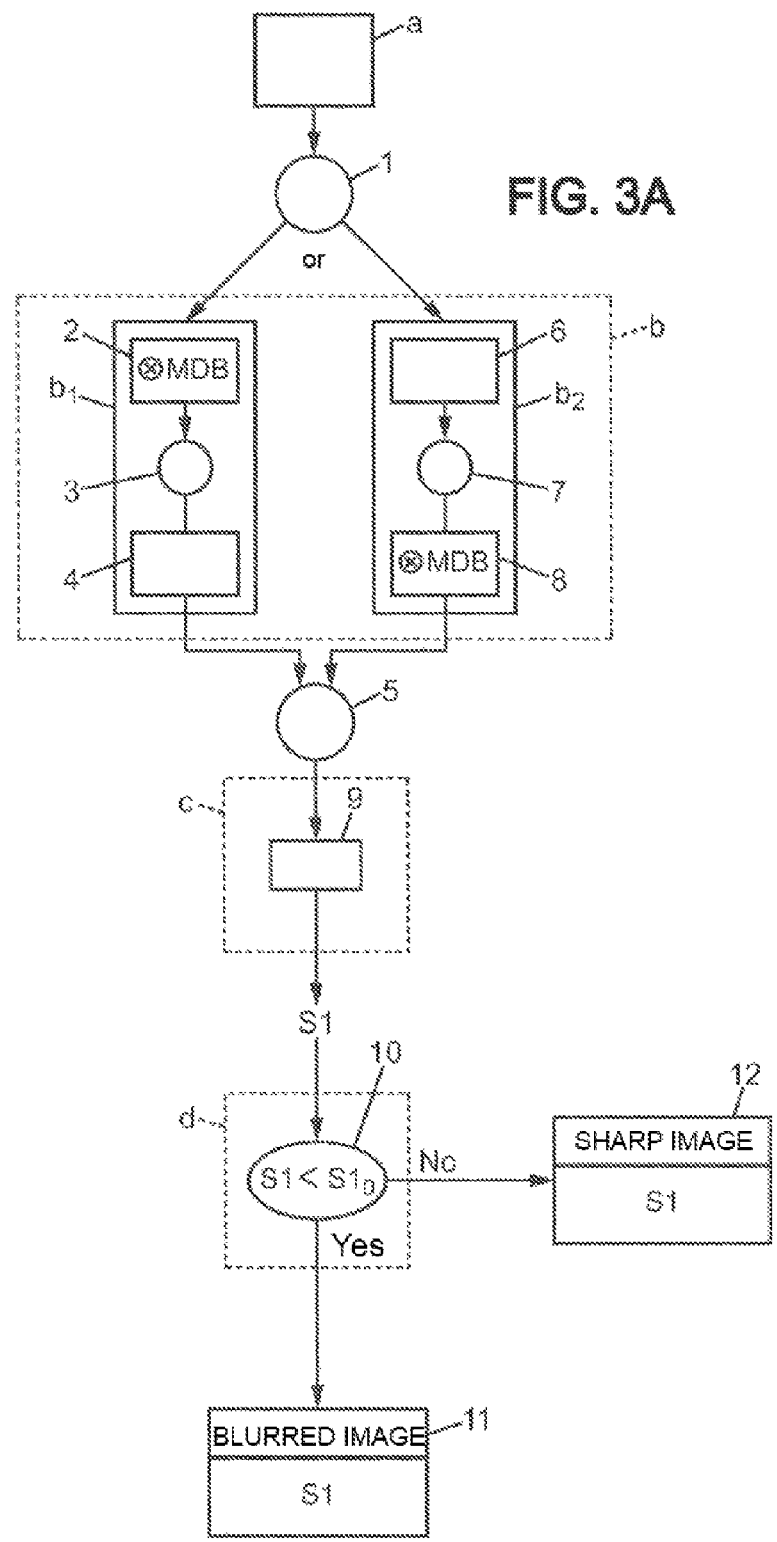

METHOD OF DETECTING AND QUANTIFYING BLUR IN A DIGITAL IMAGE

FIELD OF THE INVENTION

The invention relates to a method of detecting and quantifying blur in a digital image, and a computer program for carrying out the method.

BACKGROUND OF THE INVENTION

In numerous domains where image analysis plays a role, for example in medical imaging, it is important to be able to determine which images are blurred and to what extent. The general problem is determining which images are usable, for example for diagnostic purposes.

In the past, the evaluation was done using actual images viewed by a specialist or practitioner. Today, images are or can be digitized, meaning defined as discrete pixels or elemental points of the image. Each pixel is associated with one or more numerical parameters which give the pixel its colorimetric value according to a predetermined coding system. A known example of such coding systems is HSB (hue, saturation, brightness), or its variant HSV (hue, saturation, value).

Various techniques already exist for quantifying the blur of a digital image. Issues then arise concerning computation time, as this must be shorter when processing many images, and the relevance of the result.

Methods exist for testing the sharpness of a simple image. Some methods are fast computationally (about 100 ms per 512×512 pixel image), but not very reliable (camera autofocus, color intensity analysis). These methods allow comparing a certain number of images fairly efficiently and then choosing the sharpest one, although without being able to measure the sharpness in absolute terms.

Other methods (Fourier transform, wavelet transform) are more complex and slower computationally (about 500 ms to 3s per 512×512 pixel image) and have other disadvantages (impossible to differentiate a uniform image from a blurred image).

Many articles exist concerning blur detection in digital images. One notable example is *Blur Detection for Digital Images Using Wavelet Transform* by HANGHANG TONG, MINGJING LI, HONGJIANG ZHANG, CHANGSHUI ZHANG; 2004 IEEE *International Conference on multimedia and expo*: ICME 27-30/06/2004, Taipei, Taiwan. This article presents a blur detection algorithm using wavelet transform. The analysis is also a function of the square of the number of pixels. Thus the computation time for an image is about one second. In addition, the blurred images used for the tests were produced using sharp source images to which various types of digital blurring were applied (blur matrices). Digital blur is much easier to detect reliably than "analog" blur due for example to improper focus or unanticipated movement during the image capture.

The aim of the present invention is to overcome some or all of the above disadvantages, in particular to provide a method for quantifying blur that is both very fast and at least as reliable, if not more reliable, than existing methods, in particular for "analog" type blur.

SUMMARY OF THE INVENTION

The solution of the invention concerns a method of detecting and quantifying blur in a digital image, making use of a computer and comprising:

a step a) of obtaining a digital image comprising pixels and colorimetric coding parameters associated with the pixels;

a step b) of obtaining a brightness parameter for each pixel, on the basis of the digital image, said step b) comprising a convolution operation with an edge detection matrix;

a step c) of calculating a score S1 comprising the maximum, calculated over all the pixels, of the brightness parameter obtained in step b); and a step d) of evaluating the digital image, the digital image being considered to be blurred if the score S1 obtained in step c) is strictly less than a first predetermined threshold, the score S1 providing a first quantity of blur present in the digital image.

"Obtaining a digital image" is understood to mean that a digital image is procured. It may be a preexisting image or may be generated by any appropriate means known to a person skilled in the art, such as a CCD camera. Each pixel is an elemental component of the digital image. In general, the image is two-dimensional (2D), meaning that the position of the pixels can be defined with two coordinates x and y.

Each pixel is associated with colorimetric coding parameters. The best known are the RGB system (for red, green, blue), and HSV and its analog HSB (hue, saturation, value and hue, saturation, brightness). These coding systems are generally analogous and known conversion relations can be used to change from one to another. Brightness is analogous to luminosity.

The image can be of any shape. It is generally rectangular or square. It can be represented by a matrix associating each pixel with its colorimetric parameters. Even if the image is not rectangular, the "missing" pixels can always be added and neutral parameters assigned to them. For example, for a round image this means adding corners to it.

It should also be pointed out that the matrix representation, convenient as it is, is not the only possibility. In the method of the invention, it would be completely equivalent to perform the same calculations without representing them in matrix form. The matrix representation is helpful because it is ideal for computer programming and allows expressing calculations in a condensed manner. However, it is not the form of the calculation that is important, but rather its function and its result.

After the step a) of acquiring (or obtaining) a digital image, in step b) a brightness parameter is calculated for each pixel.

Step b) includes contour detection for the digital image (to find the edges) and an extraction of a brightness parameter per pixel. The contour detection is obtained by a convolution operation using an edge detection matrix.

An image can be represented by a matrix M for which each value M(x,y) is equivalent to the value of the image pixel at position (x,y). This matrix is also equivalent to a two-dimensional function f(x,y), which for each value of x and y is equal to the value of the pixel at position (x,y).

Let lum(f(x,y)) be the function which extracts the luminosity value of the pixel f(x,y).

One can detect that a pixel (x,y) of an image is an edge when the value of the norm of the gradient of lum(f(x,y) exceeds a certain threshold (Slum) at (x,y). (|grad lum(f(x,y))|>Slum).

By keeping the values greater than a threshold Slum of the gradient of the intensity of the pixels in the image, the pixels that are included in the edges of an image are detected (for example, with Slum=20/255).

Another more effective manner is to detect that a pixel (x,y) of an image is an edge when the value of the norm of the gradient of the matrix M has a local maximum at (x,y), meaning when |grad lum(f(x,y))|>0 and when the value of the laplacian of lum(f(x,y)) is zero in (x,y). (grad² lum(f(x,y))=0).

By retaining the local maxima of the intensity gradient of the pixels in the image, the pixels that are included in the edges of an image are detected.

Here are a few examples of edge detection matrices (also referred to as kernels):

8-connected Laplace kernel:

$$MDB = \begin{matrix} +1 & +1 & +1 \\ +1 & -8 & +1 \\ +1 & +1 & +1 \end{matrix}$$

4-connected Laplace kernel:

$$MDB = \begin{matrix} 0 & +1 & 0 \\ +1 & -4 & +1 \\ 0 & +1 & 0 \end{matrix}$$

Sobel kernel:

$$MDB = \begin{matrix} +1 & 0 & -1 \\ +2 & 0 & -2 \\ +1 & 0 & -1 \end{matrix}$$

Prewitt kernel:

$$MDB = \begin{matrix} +1 & 0 & -1 \\ +1 & 0 & -1 \\ +1 & 0 & -1 \end{matrix}$$

The brightness value is extracted from the pixel colorimetric coding, which contains this information.

The product of the convolution of a matrix (the digital image) by a second matrix (convolution kernel, here an edge detection matrix) is a matrix (here representing the edge detection image, meaning an image with contours defined) in which the value of each pixel is a linear combination of the value of the pixel concerned and that of its neighbors. The second matrix (edge detection matrix) contains the coefficients of the linear combination. The linear combination is intended to find the edges, in the sense specified above, contained in the initial digital image. An example of the calculation is provided below.

Let M be a first matrix of size (Ma, Mb) (with Ma rows and Mb columns), representing one of the components of the image (the luminosity for example) and let MDB be a second matrix, the edge detection matrix, of size (MDBa,MDBb), (with MDBa rows and MDBb columns). By convention, the coordinates of MDB are relative to its center, if its size is an odd number, or relative to the column and row which are closest to the center and the least distanced from the first coordinate of the matrix, if its size is an even number. Example: for $$MDB1 = \begin{matrix} 0 & -1 & 0 \\ -1 & 4 & -1 \\ 0 & -1 & 0 \end{matrix},$$

of size 3×3, the numbering is as follows:
MDB1(-1,-1)=0, MDB1(-1,0)=-1, MDB1(-1,1)=0,
MDB1(0,-1)=-1, MDB1(0,0)=4, MDB1(0,1)=-1,
MDB1(1,-1)=0, MDB1(1,0)=-1, MDB1(1,1)=0.

Let M' be the matrix of size (Ma,Mb) resulting from the convolution of the matrices M and MDB.

To calculate M', we proceed as follows:

$$M'(x, y) = \sum_{(m>-MDBa/2)}^{(MDBa/2)} \sum_{(n>-MDBb/2)}^{(MDBb/2)} MDB(m, n) * M(x+m, y+n)$$

with m being an integer contained within the interval [-MDBa/2; MDBa/2], n being an integer contained within the interval [-MDBb/2; MDBb/2], x being an integer contained within the interval [0; Ma-1], and y being an integer contained within the interval [0; Mb-1].

In addition, M'(x,y)=0 where x<MDBa/2-1 or y<MDBb/2-1, or x≥Ma-1-(MDBa/2-1) or y≥Mb-1-(MDBb/2-1).

Lastly, M'(x,y) is not defined for x<0 or y<0 or x>Ma-1 or y>Mb-1.

Thus the convolution of the entire image with the edge detection matrix will result in a new image, in which each of the components (red, green, blue, or hue, saturation, luminosity for example) will have been convoluted with the edge detection matrix.

In step c), a score (or result) S1 is calculated which contains the maximum, calculated over all the pixels, of the brightness parameter obtained in step b). S1 can be equal to this maximum (simplest case), but it is clear than a multiple of this maximum, or more generally the transformation of this maximum by a monotonic function, would also be suitable.

Step d) is the detection step. The image is considered to be blurred if the score S1 is strictly less than a first predetermined threshold. The determination of this threshold generally results from experience. Its value can depend on the type of digital image concerned and how strict one wants the blur detection criterion to be.

In addition, the parameter S1 provides a first quantity of blur in the image. More specifically, it is 1 minus S1 which quantifies the blur, because the lower the value of S1, the greater the blur.

Tests have shown that the method provides results which agree with what the human eye considers to be more or less blurry, in particular in the case of "analog" blur due to improper focus of a focusing device, such as an optical microscope for example.

In addition, the method is fast and allows processing a large number of images. Most computational algorithms used in the prior art (Fourier transform, wavelets, etc.) require N-squared calculation times, N being the number of pixels, while the method of the invention is linear (calculation times proportional to N). In addition, the method is absolute, because it does not require comparing the image with a benchmark image.

The method, when applied to the issue of focusing a device that produces images, allows quickly correcting an incorrect focus (correction of "analog" blur).

Steps b) and c) make use of a computer.

In some particular embodiments, the invention may make use of one or more of the following characteristics:

step b) is a step b1) of convolving the digital image with the edge detection matrix in order to obtain an edge detection image, and extracting said brightness parameter for each pixel from the edge detection image. In step b1), the convolution occurs before the brightness is extracted.

step b) is a step b2) of extracting a brightness value for each pixel from the digital image in order to obtain a brightness matrix, and of convolving the brightness matrix with the edge detection matrix in order to obtain said brightness parameter for each pixel. Step b2) is an alternative to step b1), in which the convolution occurs after the brightness is extracted. It generally leads to the same result, with the advantage of reducing the calculations because the convolution involves the brightness only, not all parameters of the digital image.

the brightness parameter is the brightness in the sense of the "hue, saturation, brightness" color system (HSB). Among all possible definitions of brightness or luminosity, brightness in the sense of the HSB color system provides good results. In addition, if the digital image is directly coded in HSB mode, the calculations for extracting the B parameter are trivial.

the brightness parameter and the score S1 being expressed as percentages, the first predetermined threshold is between 90% and 100%, preferably between 95% and 99.5%. These ranges are preferred ranges for "analog" type blur, in the sense that the score S1 then leads, for a large number of test images, to results which agree with what the human eye considers to be blurred or sharp.

the first predetermined threshold is between 97% and 99%. These ranges are even more preferred in the case of "analog" blur.

in step c), a second score S2 is calculated including a quotient which comprises: in the numerator, the sum, calculated over all the pixels, of the brightness parameters obtained in step b) which exceed a predetermined brightness threshold, and in the denominator, the sum, calculated over all the pixels, of the brightness parameters obtained in step b); and in step d), the digital image is also considered to be blurred if the score S2 obtained in step c) is strictly less than a second predetermined threshold, the score S2 additionally providing a second quantity of blur present in the digital image. This parameter, or score, S2 supplements the first score S1. To be considered as sharp, the image must additionally possess a score S2 greater than or equal to a second predetermined threshold. The same comments concerning the interpretation which were made for the calculation of S1 and the first predetermined threshold, apply to the calculation of S2 and the second threshold. In particular, the score S2 can be the quotient expressed above, or a monotonic function of this quotient. The second predetermined threshold and the brightness threshold can come from and be fine-tuned through experience. The score S2 generally gives a more refined quantification of the blur present in the digital image than the score S1 does. For example, the score S1 can be used for "all or nothing", meaning for deciding that the image is blurred or sharp on the basis of the score S1. The score S2 can be used for quantifying the blur.

the brightness parameter and the score S2 being expressed as percentages, the brightness threshold is between 3% and 40%, preferably between 5% and 20%, and the second predetermined threshold is between 50% and 100%, preferably between 70% and 90%. These ranges are preferred ranges for "analog" type blur, in the sense that the scores S1 and S2 then lead, for a large number of test images, to results which agree with what the human eye considers to be blurred or sharp.

the brightness threshold is between 7% and 15%, and the second predetermined threshold is between 75% and 85%. These ranges are even more preferred in the case of "analog" blur.

In step b1), first the digital image is convolved with an edge detection matrix (MDB). In matrix terms, the product of convolving the matrix representing the digital image with an "edge detection" matrix is calculated. The result of the convolution is a new matrix, representing an edge detection image. The function of this calculation is to define the contours of the digital image, meaning to emphasize the edges. The result is a new image in which the edges are emphasized.

Then, from the edge detection image (or its representative matrix), a brightness parameter is extracted for each pixel in this image. In practice, one takes the colorimetric parameters and calculates a brightness parameter. If the coding system is HSB, this means retaining only the "B" (brightness). If another coding system was used, the calculations are more complex but do not pose any particular problems.

Step b2) is a possible alternative to step b1). It is distinguished by the fact that it begins by extracting a brightness value for each pixel. One thus obtains a brightness image, represented by a brightness matrix. Then this brightness matrix is convolved with an edge detection matrix. In this manner a brightness parameter is obtained for each pixel. This alternative is equivalent functionally and from the point of view of the results, and generally requires fewer calculations because the convolution only concerns a matrix with one colorimetric parameter (brightness value) instead of concerning a thicker matrix containing several parameters for each pixel.

The invention also relates to a computer program product, comprising at least one sequence of instructions stored and readable by a processor and which, once read by this processor, causes steps b), c) and d) of the method as described above to be carried out.

In one particular embodiment, the product can be a computer-readable medium containing the computer program product.

BRIEF DESCRIPTION OF THE DRAWINGS

Other features and advantages of the invention will become apparent from the following description of some non-limiting example embodiments, with reference to the attached drawings in which:

FIG. 3A illustrates a method for detecting and quantifying blur in a digital image according to the invention.

DETAILED DESCRIPTION

For clarity, the dimensions of the various elements represented in these figures are not necessarily proportional to their actual dimensions. In the figures, the same references are used to denote identical elements.

Figure 1A:
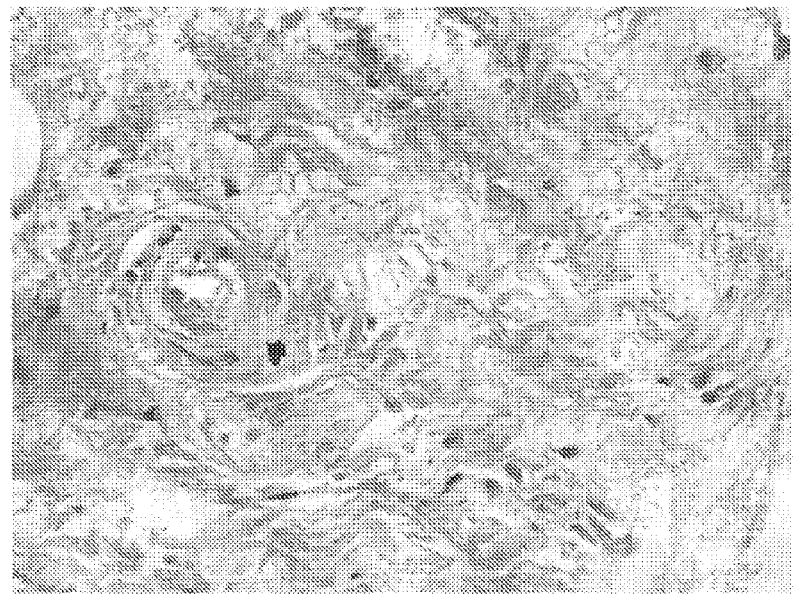
FIGS. 1A and 1B represent two images of a same sample taken by a microscope at two different foci, illustrating the concept of analog blur due to a "poor" focus.
Figure 1B:
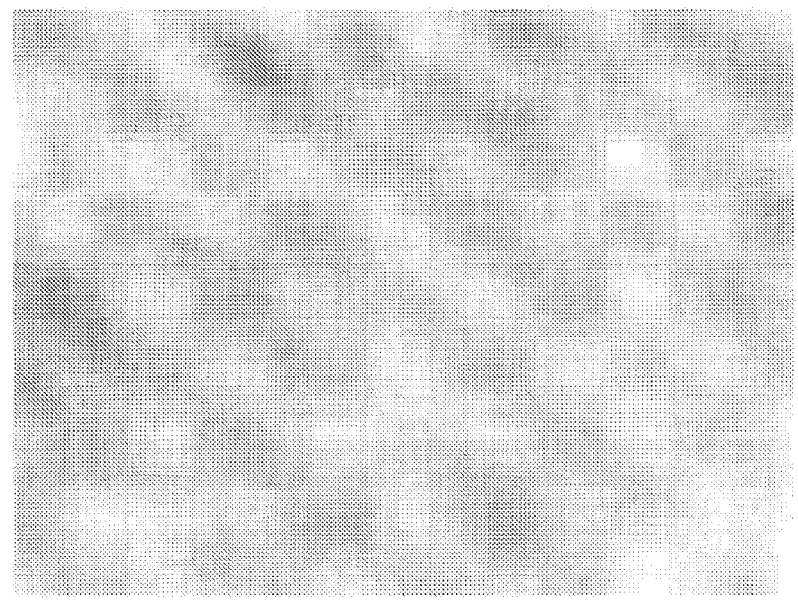

FIGS. 1A and 1B represent two images of a same sample, taken by a microscope at two different foci. Image 1A appears "sharp", while image 1B appears "blurred".

Figure 2A:
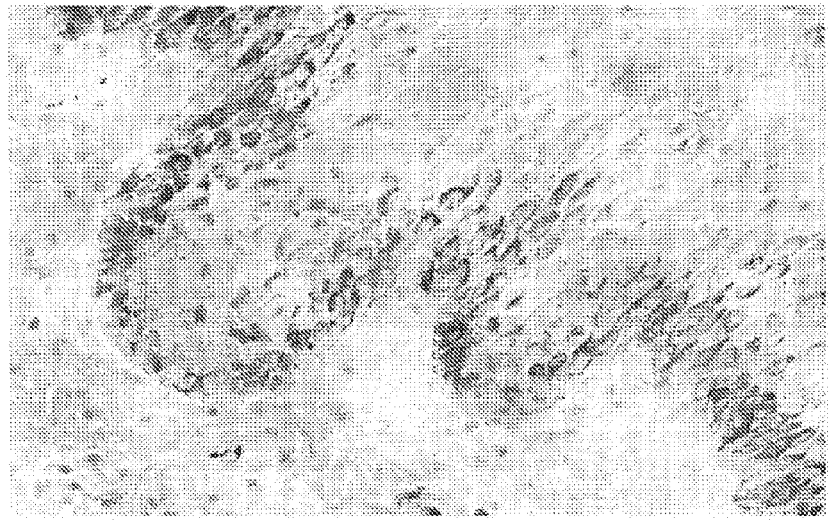
FIGS. 2A and 2B represent two images of another sample taken by a microscope at two different foci.
Figure 2B:
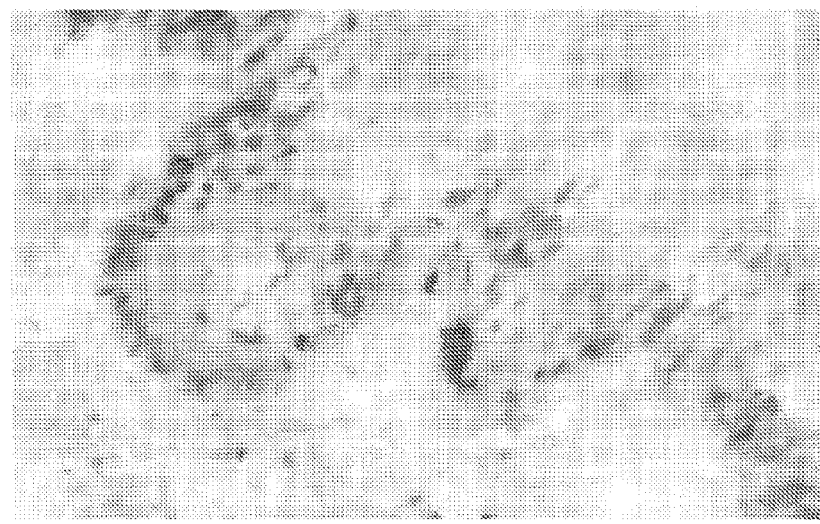

Similarly, FIGS. 2A and 2B represent two images of a same second sample with two different foci. Image 2A appears "sharp", while image 2B appears "blurred".

A method of the invention has been applied to these images with the following parameters:
 brightness threshold of 20/255, meaning 7.8% (for the calculation of S2), and second predetermined threshold of 75%; S1 was calculated using a step b) of type b2);
 first predetermined threshold of 98%.
The following results were obtained:
 image 1A: score S1 of 100%, score S2 of 76.83%,
 image 1B: score S1 of 17%, score S2 of 0.88%,
 image 2A: score S1 of 100%, score S2 of 97.07%,
 image 2B: score S1 of 58%, score S2 of 43.56%.

II follows that image 1A is detected as sharp from the point of view of score S2 (S2 is greater than or equal to the second predetermined threshold which is 75%) as well as from the point of view of score S1 (S1 is greater than or equal to the first predetermined threshold which is 98%). The amount of blur in image 1A is given by the scores S1 and S2. Conversely, for image 1B, score S2 is strictly less than the second predetermined threshold and S1 is strictly less than the first predetermined threshold. Image 1B is therefore detected as blurred. The amount of blur in image 1B is given by the scores S1 and S2. If preferred, one can also express the amount of blur by 1-S1 and 1-S2, to have amounts that increase as the blur increases.

Similarly, image 2A is detected as sharp from the point of view of score S2 (S2 is greater than or equal to the second predetermined threshold) as well as from the point of view of score S1 (S1 is greater than or equal to the first predetermined threshold). Conversely, for image 1B, score S2 is strictly less than the second predetermined threshold and S1 is strictly less than the first predetermined threshold. Image 1B is therefore detected as blurred.

One can also deduce from this that the focus is unsuitable for images 1B and 2B.

FIG. 3A illustrates a method of detecting and quantifying blur in a digital image according to the invention. Step a) consists of obtaining a digital image 1, for example using a digital video camera or camera. The image may for example have 512×512 pixels and be coded in HSB mode (hue, saturation, brightness). The coding parameters may be expressed in an absolute manner or as a percentage. 100% means that the parameter is at its maximum value on a predetermined scale (for example from 0 to 255).

Next, an image processing step b) is conducted. In the example, it is step b2). It begins by extracting (sub-step 6) a brightness value from the digital image 1 for each pixel. Thus, for each pixel, as we have the H, S, B parameters of the colorimetric coding system, only the B parameter is retained. This results in a brightness matrix 7.

This brightness matrix 7 is convolved (sub-step 8) with an edge detection matrix MDB, for example the Laplace 3×3 matrix which has the following form:

$$MDB = \begin{matrix} +1 & +1 & +1 \\ +1 & -8 & +1 \\ +1 & +1 & +1 \end{matrix}$$

This means that at each location in the brightness image represented by the matrix 7, a Laplacian is calculated for the brightness values. The edges contained in the resulting image have a zero brightness value.

Alternatively, a Sobel matrix can be used as the edge detection matrix. In this case:

$$MDB = \begin{matrix} -2 & -2 & 0 \\ -2 & 0 & +2 \\ 0 & +2 & +2 \end{matrix}$$

One can also use linear combinations (or rotations by multiples of pi/4) of Laplace and Sobel matrices, or their transposes.

The result of the convolution is a new matrix 5 (or image) which contains one brightness parameter per pixel. The contour of this image is outlined by the convolution effect.

Next, in step c), the score S1 is calculated (sub-step 9). This is the maximum brightness parameter over all the pixels that is obtained at the end of steps b1) or b2) (step b2) in this example).

In step d), the result or results obtained in step c) are used. In its most general application, the method only uses the score S1 defined above (criterion 10). If it is strictly less than a first predetermined threshold $S1_0$ (for example 98%), the digital image 1 is considered to be blurred (case 11). If it is greater than or equal to this first predetermined threshold $S1_0$, the digital image 1 is considered to be sharp (case 12). Score S1 also allows quantifying the blur. More specifically, the larger 1-S1 is, the greater the blur.

In the method, step b1) represents a possible alternative to step b2). In step b1), one always starts with a digital image 1 representable by a matrix. The step begins with convolving (sub-step 2) this matrix 1 with the edge detection matrix MDB. Thus the convolution concerns all parameters of the digital image and not only the brightness. An edge detection image 3 is obtained. Next, in sub-step 4, a brightness parameter is extracted for each pixel, from the edge detection image 3; this forms the matrix 5.

Step b2) is an alternative to step b1) which generally requires fewer calculations. When examining a series of images, generally either one or the other of steps b1) or b2) is consistently applied in order to maintain uniformity in the processing. In other words, either b1) or b2) is chosen once and for all when examining a series of images.

Figure 3B:
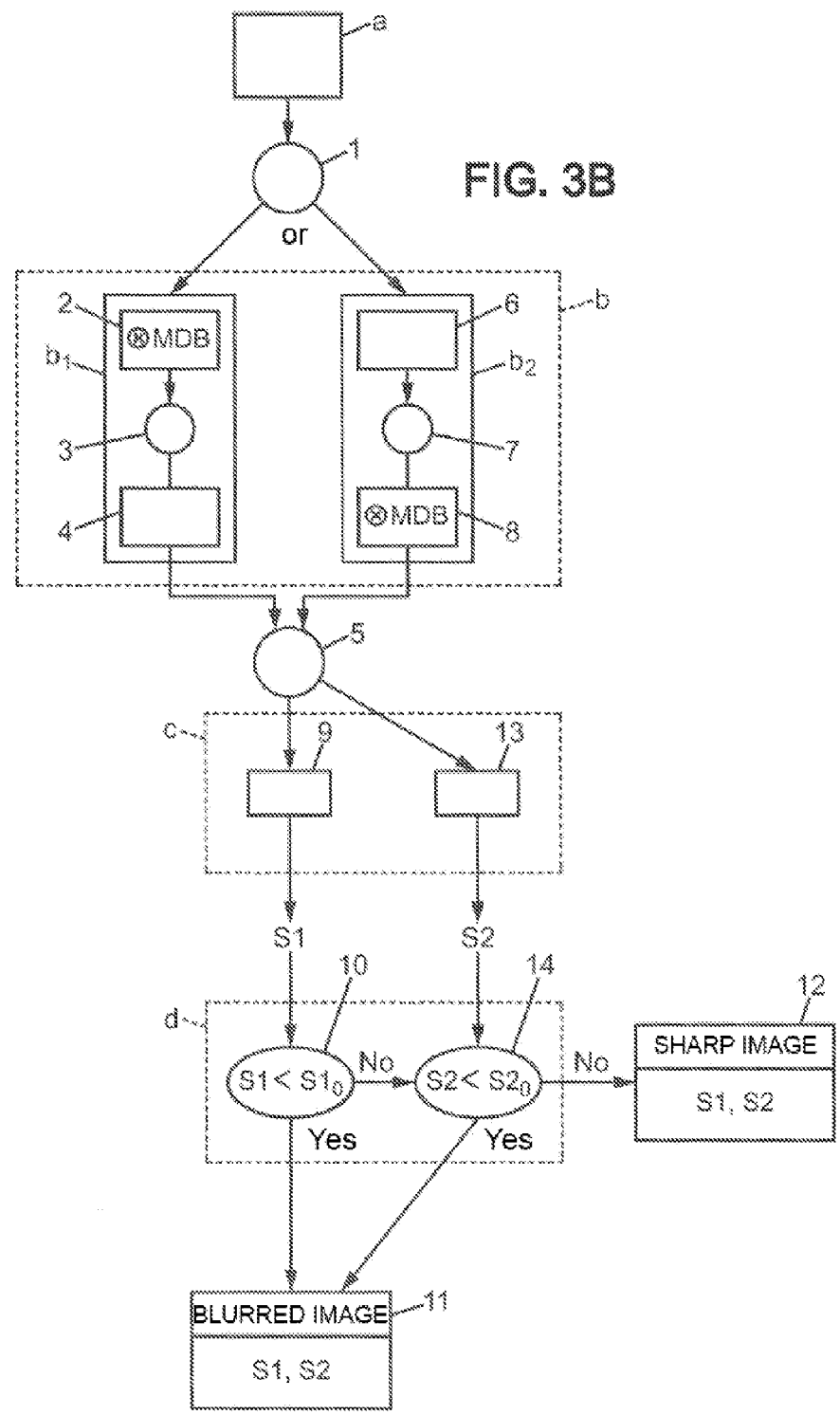
FIG. 3B illustrates a variant of the method of the invention.

FIG. 3B represents an embodiment which retains all the characteristics of the previous figure (FIG. 3A). It differs in steps c) and d) where it incorporates a second score S2 to supplement the first score S1.

In step c), a quotient is calculated (sub-step 13). In the denominator, we have the sum, over all the pixels, of the brightness parameters of the matrix 5. In the numerator, we have the same sum, without the brightness parameters that are less than or equal to a predetermined brightness threshold, for example 20/255 (which is 7.8%).

In step d), the second score S2 is compared (test 14) to a second predetermined threshold $S2_0$ (for example 75%). For an image to be considered to be sharp, S1 must be greater than or equal to $S1_0$ and S2 must be greater than or equal to $S2_0$ (case 12). Conversely, if S1 is strictly less than $S1_0$ or S2 is strictly less than $S2_0$ (case 11), the image is considered to be blurred. S1 and S2 quantify the blur (or 1-S1 and 1-S2). One could also calculate a score including these two scores, for example a norm of the vector (S1, S2).

Joint calculation of the first score S1 and of the second score S2 thus allows detecting whether an image is:
- completely sharp: in this case, S1 and S2 are greater than or equal to their respective predetermined thresholds $S1_0$ and $S2_0$;
- partially sharp, meaning that there exists at least one sharp region in the image and the rest of the image is blurred: in this case, S1 is greater than or equal to $S1_0$ and S2 is strictly less than $S2_0$;
- entirely blurred: in this case, S1 and S2 are strictly less than their respective predetermined thresholds $S1_0$ and $S2_0$.

Using the exact values of S1 and S2 in conjunction also allows ordering the images according to their level of sharpness (or their level of blur).

In particular, the values of S1 and S2 are necessary for determining that an image is partially blurred, meaning that it contains both at least one blurred region and at least one sharp region.

The invention claimed is:

1. Method of detecting and quantifying blur in a digital image, making use of a computer and comprising:
   a step a) of obtaining a digital image comprising pixels and colorimetric coding parameters associated with the pixels;
   a step b) of obtaining a brightness parameter for each pixel, from the digital image, said step b) comprising a convolution operation with an edge detection matrix;
   a step c) of calculating a score S1 comprising the maximum, calculated over all the pixels, of the brightness parameter obtained in step b); and
   a step d) of evaluating the digital image, the digital image being considered to be blurred if the score S1 obtained in step c) is strictly less than a first predetermined threshold $S1_0$, the score S1 providing a first quantity of blur present in the digital image,
   wherein:
   in step c), a second score S2 is calculated including a quotient which comprises:
   in the numerator, the sum, calculated over all the pixels, of the brightness parameters obtained in step b) which exceed a predetermined brightness threshold, and
   in the denominator, the sum, calculated over all the pixels, of the brightness parameters obtained in step b); and
   in step d), the digital image is also considered to be blurred if the score S2 obtained in step c) is strictly less than a second predetermined threshold $S2_0$, the score S2 additionally providing a second quantity of blur present in the digital image.

2. Method according to claim 1, wherein step b) is a step b1) of convolving the digital image with the edge detection matrix in order to obtain an edge detection image, and extracting said brightness parameter for each pixel from the edge detection image.

3. Method according to claim 1, wherein step b) is a step b2) of extracting a brightness value for each pixel from the digital image in order to obtain a brightness matrix, and convolving the brightness matrix with the edge detection matrix in order to obtain said brightness parameter for each pixel.

4. Method according to claim 1, wherein, the second score S2 being expressed as percentages, the brightness threshold is between 3% and 40%, preferably between 5% and 20%, and the second predetermined threshold is between 50% and 100%, preferably between 70% and 90%.

5. Method according to claim 1, wherein the brightness parameter is the brightness in the sense of the "hue, saturation, brightness" (HSB) coding system.

6. Method according to claim 1, wherein the brightness parameter and the score S1 being expressed as percentages, the first predetermined threshold is between 90% and 100%, preferably between 95% and 99.5%.

7. Method according to claim 1, wherein the digital image is considered to be:
   completely sharp if the scores S1 and S2 are greater than or equal to their respective predetermined thresholds $S1_0$ and $S2_0$,
   partially sharp if the score S1 is greater than or equal to the first predetermined threshold $S1_0$ and the score S2 is strictly less than the second predetermined threshold $S2_0$, or
   entirely blurred if the scores S1 and S2 are strictly less than their respective predetermined thresholds $S1_0$ and $S2_0$.

8. Method according to claim 1, wherein images are ordered according to their level of blur using the exact values of the scores S1 and S2 in conjunction.

9. Method according to claim 1, wherein the presence of at least one sharp region and at least one blurred region in an image is determined using the exact values of the scores S1 and S2 in conjunction.

10. A non-transitory computer-readable medium having stored thereon at least one sequence of instructions stored readable by a processor and which, once read by this processor, causes the processor to:
    step a) obtain a digital image comprising pixels and colorimetric coding parameters associated with the pixels;
    step b) obtain a brightness parameter for each pixel, from the digital image, said step b) comprising a convolution operation with an edge detection matrix;
    step c) calculate a score S1 comprising the maximum, calculated over all the pixels, of the brightness parameter obtained in step b); and
    step d) evaluate the digital image, the digital image being considered to be blurred if the score S1 obtained in step c) is strictly less than a first predetermined threshold $S1_0$, the score S1 providing a first quantity of blur present in the digital image,
    wherein:
    in step c), a second score S2 is calculated including a quotient which comprises:
    in the numerator, the sum, calculated over all the pixels, of the brightness parameters obtained in step b) which exceed a predetermined brightness threshold, and
    in the denominator, the sum, calculated over all the pixels, of the brightness parameters obtained in step b); and
    in step d), the digital image is also considered to be blurred if the score S2 obtained in step c) is strictly less than a second predetermined threshold $S2_0$, the score S2 additionally providing a second quantity of blur present in the digital image.

11. A computer processor programmed according to the non-transitory computer-readable medium of claim 9.

* * * * *